United States Patent [19]

Bradus

[11] 4,272,821
[45] Jun. 9, 1981

[54] DIGITAL BLADE ADJUSTMENT READ-OUT FOR A PORTABLE POWER TOOL

[75] Inventor: Robert Bradus, Randallstown, Md.

[73] Assignee: Black & Decker Inc., Newark, Del.

[21] Appl. No.: 76,705

[22] Filed: Sep. 18, 1979

[51] Int. Cl.³ .............. G06F 15/46; B27C 5/10; G01B 7/26

[52] U.S. Cl. .............. 364/475; 33/125 R; 144/134 D; 144/136 C; 364/562; 409/182

[58] Field of Search .............. 364/474, 475, 561, 562, 364/563; 235/92 MP, 92 EA; 340/686, 687, 688, 679, 680; 33/125 R, 169 B, 166, 172 E, 143 L, 147 N; 409/69, 182; 408/16, 116; 116/230–232; 73/901; 144/134 D, 136 C

[56] References Cited

U.S. PATENT DOCUMENTS

| | | | |
|---|---|---|---|
| 2,876,662 | 3/1959 | Carlstedt et al. | 116/231 X |
| 3,363,510 | 1/1968 | Burrows et al. | 409/182 |
| 3,405,257 | 10/1968 | Rantsch et al. | 364/474 X |
| 3,443,479 | 5/1969 | Hawley et al. | 409/182 |
| 3,566,827 | 3/1971 | Moseley | 116/231 |
| 3,705,400 | 12/1972 | Cordes, Jr. | 364/561 X |
| 3,895,356 | 7/1975 | Kraus | 364/562 X |

FOREIGN PATENT DOCUMENTS 2732954 11/1978 Fed. Rep. of Germany .......... 364/561

Primary Examiner—Joseph F. Ruggiero
Attorney, Agent, or Firm—Harold Weinstein; Leonard Bloom; Edward D. Murphy

[57] ABSTRACT

A digital read-out system for a portable power tool that is adapted to provide a precise digital reading of the depth adjustment of the blade of the tool. The system includes a position encoding device that is coupled to the blade adjustment mechanism of the tool. The encoder provides position feedback information to a microprocessor which is programmed to calculate the amount of blade adjustment made relative to a preselected reference positioned. In the preferred embodiment, a mercury switch is provided which is interrogated by the microprocessor to determine the orientation of the tool so that the orientation of the digital display can be controlled accordingly. In this manner, the display automatically appears rightside up even when the blade adjustment is made with the tool upside down. A mode select switch is also provided for selecting between English and Metric units.

11 Claims, 8 Drawing Figures

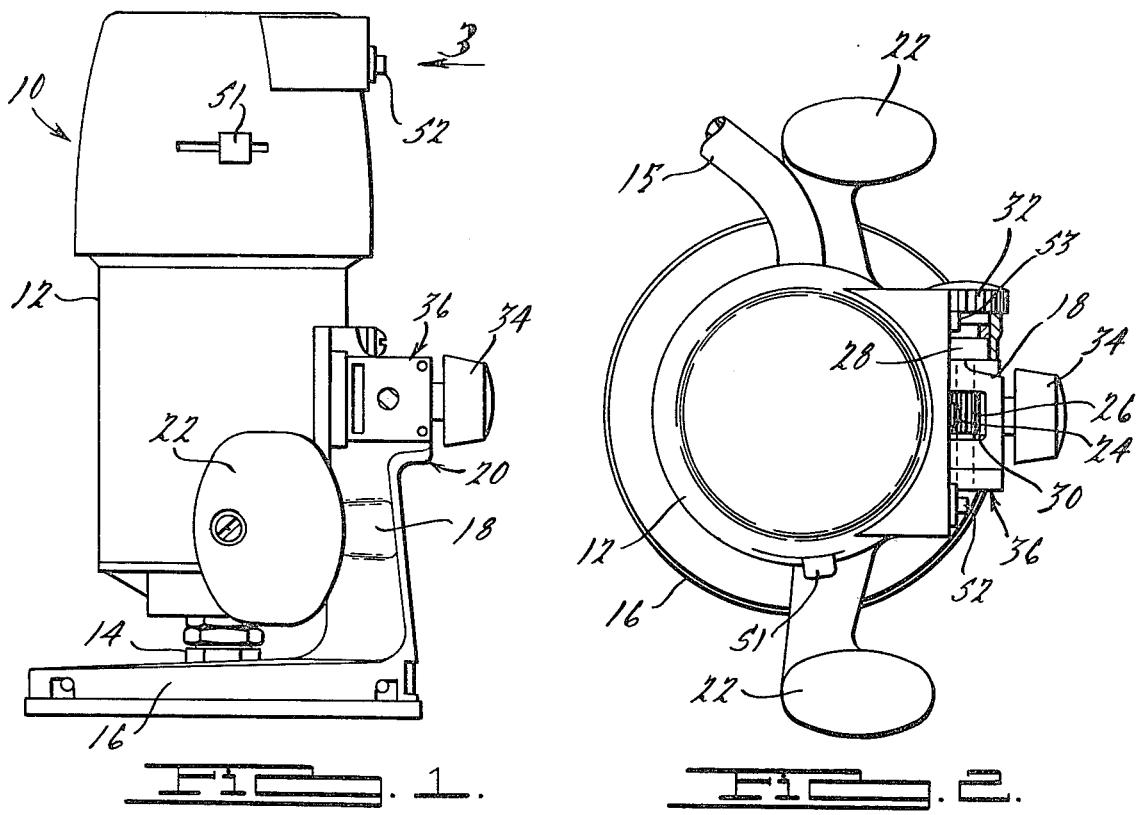

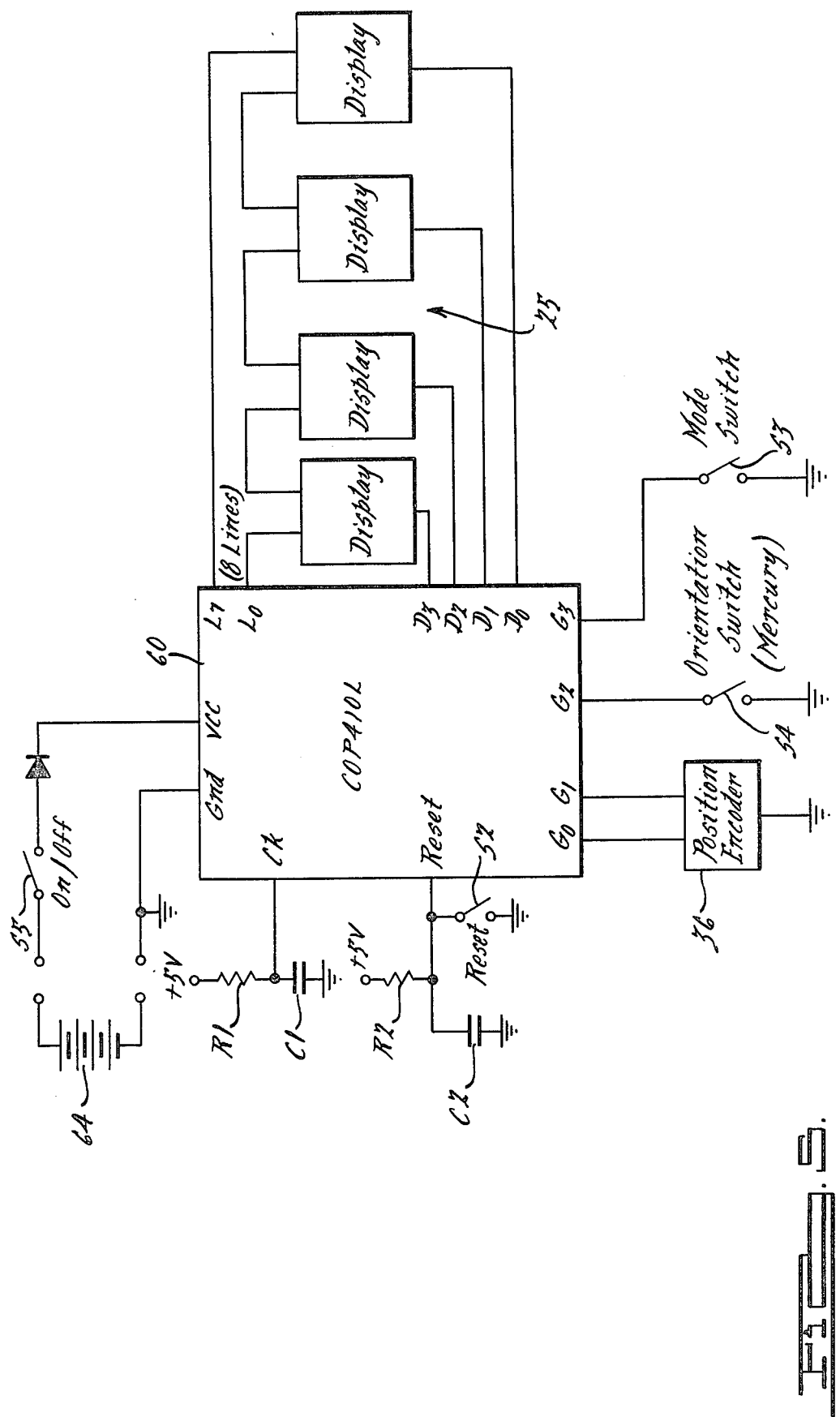

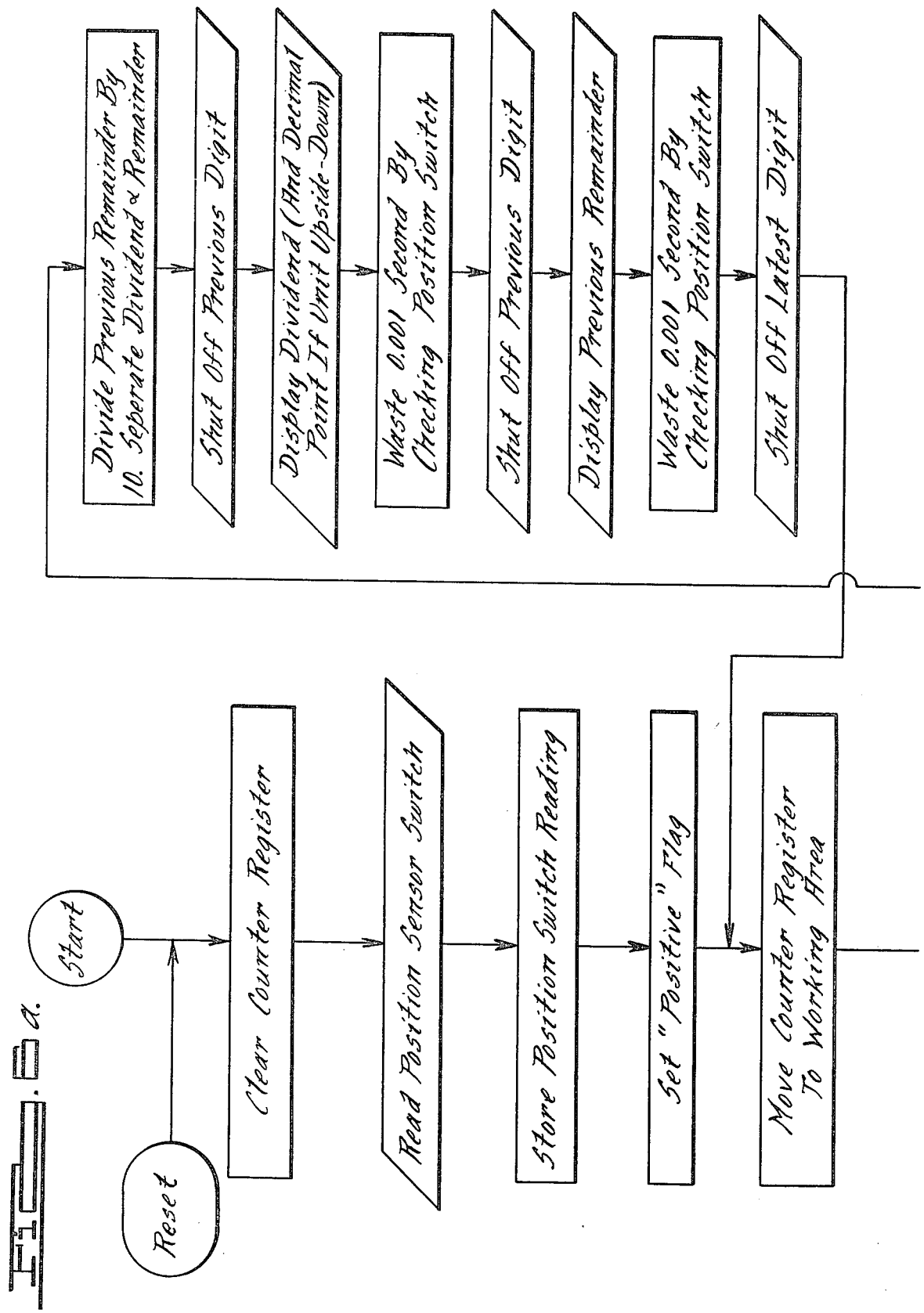

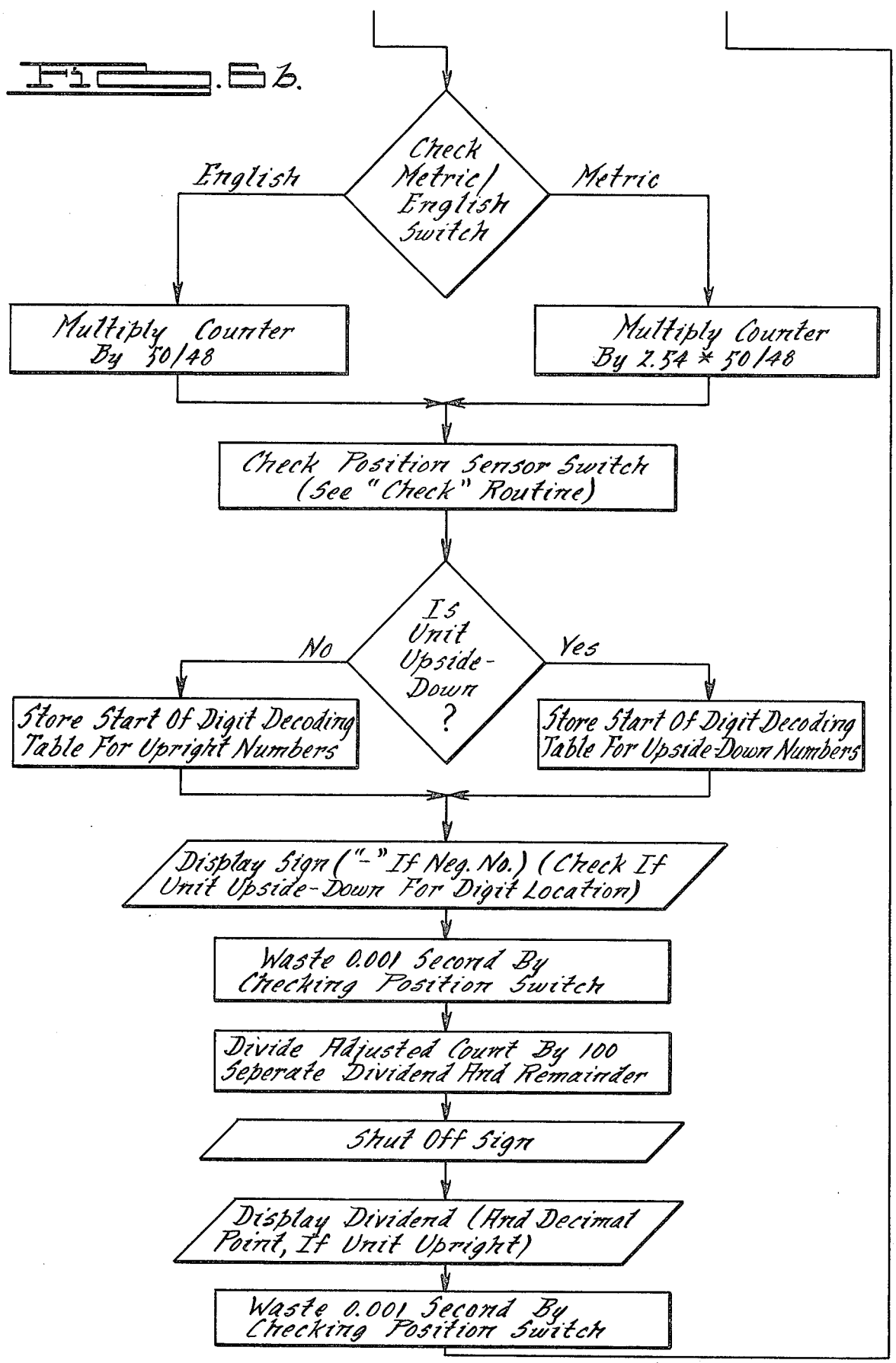

DIGITAL BLADE ADJUSTMENT READ-OUT FOR A PORTABLE POWER TOOL

BACKGROUND AND SUMMARY OF THE INVENTION

The present invention relates to power tools and in particular to a digital read-out device that is adapted to automatically provide a precise digital reading of the depth adjustment of the blade of the tool.

Hand tools such as routers and circular saws, typically have mechanisms for adjusting the cutting depth of the blade of the tool. However, obtaining a desired cutting depth is often a time consuming task in that it generally involves a trial and error process as the user cuts a sample piece of stock, measures the resulting cutting depth, and then attempts to make the appropriate corrective adjustment. In addition, it is cumbersome to make a precise depth adjustment utilizing the mechanical vernier type adjustment mechanisms found on most tools, especially when limited to the trial and error method of adjustment.

Accordingly, it is the primary object of the present invention to provide a tool having an electronic depth measuring device that is capable of providing a precise digital read-out of the depth adjustment of the blade of the tool. In general, this is accomplished through the use of a microprocessor that drives a digital display. The microprocessor receives position information from an encoder that is coupled to the blade adjusting mechanism of the tool. In the preferred embodiment herein the encoder comprises a 52-position, two-channel gray code switch that is mechanically coupled to the shaft incorporating the pinion gear of a rack and pinion adjustment mechanism. However, it is to be understood that the use of other types of position encoders is contemplated and within the scope of the present invention.

In addition, the preferred embodiment of the present invention includes the novel feature of an automatically inverting digital display which permits the operator to readily read the display when adjustments are made while the tool is upside-down, which is sometimes convenient, particularly with a router. In general, this is accomplished by programming the microprocessor to interrogate the condition of a single-pole mercury switch whose state is affected by the orientation of the tool, and then control the orientation of the digital display accordingly.

Also included in the preferred embodiment herein is a mode select capability which permits the operator to select between either an English or Metric units read-out, and a reset capability that allows the operator to readily obtain an accurate depth adjustment relative to any other preselected depth setting.

Additional objects and advantages of the present invention will become apparent from a reading of the preferred embodiment of the present invention which makes reference to the following set of drawings in which:

BRIEF DESCRIPTION OF THE DRAWINGS

FIG. 1 is a side elevational view of a router embodying the digital depth adjustment display of the present invention;

FIG. 2 is a top plan view of the router illustrated in FIG. 1;

FIG. 3 is a fragmentary view of the router of FIG. 1 showing the digital read-out;

FIG. 4 is a disassembled view of the 52-position encoder switch used in the preferred embodiment of the present invention;

FIG. 5 is a circuit diagram of the digital depth adjustment display according to the present invention; and FIGS. 6, 6a, 6c are flow charts outlining the software for the microprocessor utilized in the preferred embodiment.

DETAILED DESCRIPTION OF THE PREFERRED EMBODIMENT

Figure 8C:
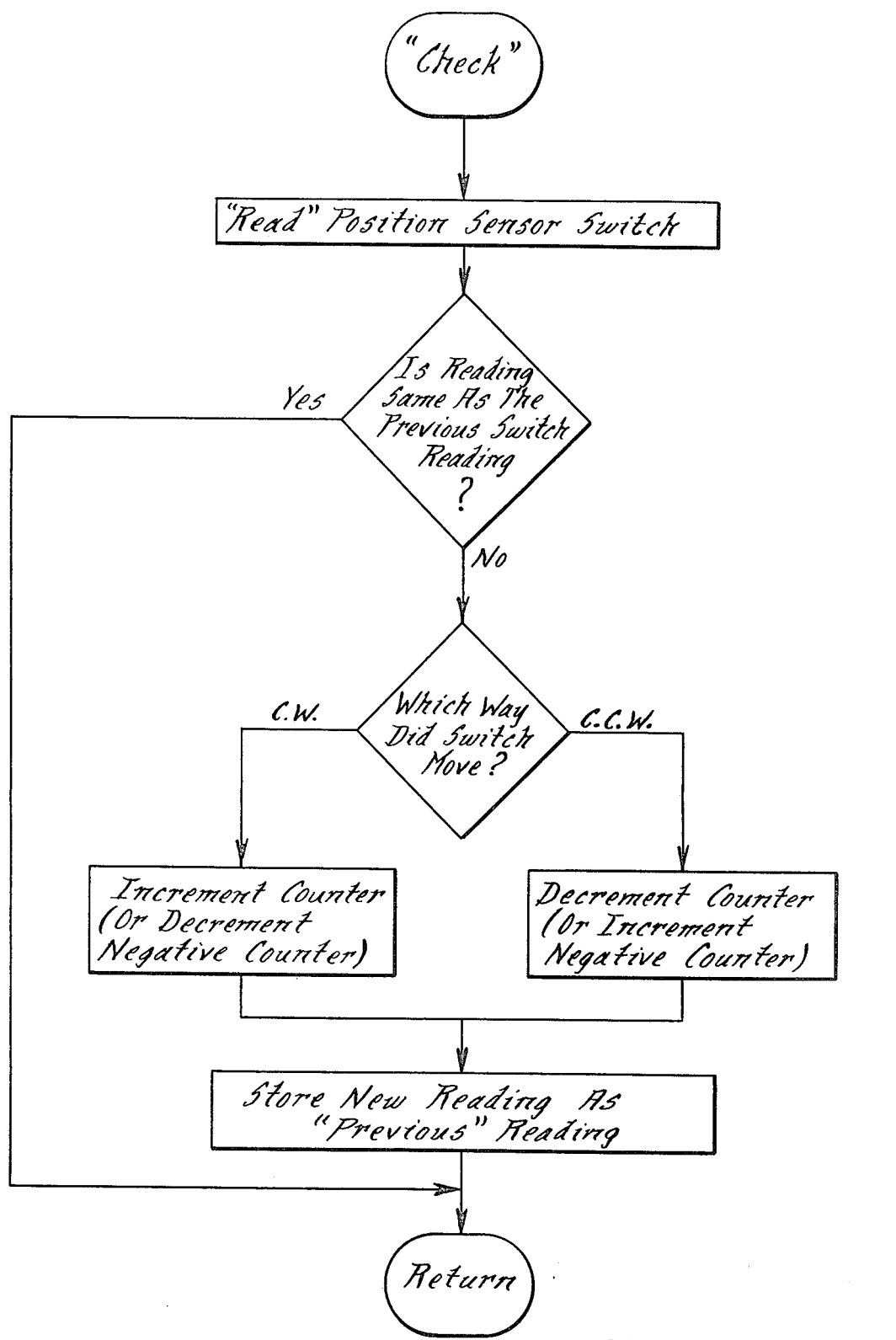

Referring to FIG. 1, a portable router 10 having a digital depth adjustment display according to the present invention is shown. At the outset it is to be understood that while the present invention is described herein in connection with a router, the invention also has application in combination with other portable power tools, such as circular saws.

The router 10 comprises a generally cylindrical housing 12 having disposed therein an electric motor. Power to the motor is provided through an ON/OFF switch S1 via the usual line cord 15 extending from the side of housing 12. The motor drives a motor shaft having a collet 14 affixed to its lower end for receiving and securing thereto a tool bit (not shown). The housing 12 is supported relative to a work surface by a base 16 having an upwardly extending integral support member 18 which incorporates an adjustment mechanism 20 for controlling the position of the housing 12 relative to the support member 18 and hence the position of the tool bit relative to the base 16. A pair of handles 22 are provided on opposite sides of the router 10 for manual manipulation thereof.

Looking to FIG. 3, the upper portion of the housing 12 has incorporated therein a four-digit LED digital display 25 that is adapted to provide a direct read-out of the cutting depth of the router 10. A momentary action reset switch S2 is located on one side of the display 25 for setting the display to zero, and a mode select slide switch S3 is disposed on the other side of the display 25 for selecting between an English or Metric units read-out.

With particular reference to FIG. 2, the housing 12 has vertically secured thereto an elongated rack 24 which is slidably received within a recess formed in base support member 18. The teeth of the rack 24 engage a pinion gear 26 carried by a shaft 28 which is journalled to a U-shaped bracket portion 30 of support member 18. An adjustment knob 32 is fastened to one end of shaft 28 such that by turning adjustment knob 32, the pinion gear 26 is rotated, thus vertically shifting the position of the rack 24 as well as the housing 12 to which it is secured. In this manner, the position of the tool bit relative to the base 16, and hence the depth of cut of the tool bit, is adjusted. A clamp (not shown) is carried within bracket portion 30 which is adapted to cooperate with rack 24 to lock the position of the housing 12 in place once an adjustment has been made. A locking knob 34 fastened to a shaft threaded to bracket portion 30 and connected to the clamp is provided for selectively tightening or loosening the clamp.

Disposed on the end of shaft 28 opposite adjustment knob 32 is a position encoder 36 which in the preferred embodiment comprises a 52-position switch. The 52-position switch 36 is adapted to produce a two-channel digital output signal that sequences through a predefined gray code as shaft 28 is rotated by adjustment knob 32. Specifically, the two output lines from the 52-position switch 36 will vary during a single revolution of shaft 28 according to the following table:

| POSITION | OUTPUTS | |
|---|---|---|
| | A | B |
| 1 | 0 | 0 |
| 2 | 1 | 0 |
| 3 | 1 | 1 |
| 4 | 0 | 1 |
| 5 | 0 | 0 |
| * | * | * |
| * | * | * |
| * | * | * |
| 48 | 0 | 1 |
| 49 | 0 | 0 |
| 50 | 1 | 0 |
| 51 | 1 | 1 |
| 52 | 0 | 1 |

The term "gray code" refers to the fact that the state of only one bit changes from one position to the next. The advantage of using a gray code for this application is that it provides a convenient means for readily determining the direction of rotation of shaft 28 and hence the direction of blade depth adjustment. In particular, if both bits are initially equal and the "A" bit changes, then the switch 36 is incrementing, whereas if the "B" bit changes the switch 36 is decrementing. Similarly, if both bits are initially unequal and the "A" bit changes, the switch 36 is decrementing, whereas if the "B" bit changes the switch 36 is incrementing.

With particular reference to FIG. 4, a disassembled view of the 52-position switch 36 utilized in the preferred embodiment is shown. The switch 36 is principally comprised of a disc 38 keyed to shaft 28 and three contact terminals 42–46 which are adapted to trace three concentric circular paths, designated 48–52 respectively, on the disc 38 as it is rotated by shaft 28. Contact terminal 46 is an input terminal and contact terminals 42 and 44 are the two output terminals of the switch 36. The disc 38 consists of a nonconductive material having disposed thereon a layer of conductive material 40. The pattern of conductive material 40 is arranged so that the input terminal 46 is in continuous contact with the conductive layer 40 while the two output terminals 42 and 44 are periodically in contact with conductive layer 40 as their paths pass over the thirteen radially extending segments 54 of the pattern. Each of the thirteen segments 54 is configured so that in a first radial position (A) neither output terminal 42 or 44 contacts conductive layer 40, in a second radial position (B) only output terminal 44 contacts conductive layer 40, in a third radial position (C) both output terminals 42 and 44 contact conductive layer 40, and in a fourth radial position (D) only output terminal 42 contacts conductive layer 40. Thus, power from input terminal 46 is provided to neither output terminal 42 or 44 in radial position (A), to only output terminal 44 in radial position (B), to both output terminals 42 and 44 in radial position (C), and to only output terminal 42 in radial position (D). This pattern is repeated, of course, for each of the thirteen segments 54, thus providing the 52 switch positions.

It will be appreciated, however, that other types of position encoding devices capable of producing the desired two-channel gray-code output may be used. For example, an optical linear position sensor may be employed comprising a light source and a pair of photo-transistors disposed on either side of a pair of parallel screens having alternate dark and light patterns thereon. By moving one of the screens in accordance with blade depth adjustments and maintaining the other screen stationary, the conductivity of the two photo-transistors can be controlled in any manner desired. Additional approaches are of course possible.

Turning now to FIG. 5, a circuit diagram of the digital depth adjustment read-out for a portable power tool according to the present invention is shown. The circuit is principally comprised of a microprocessor 60 which in the preferred embodiment is a COP410L single chip, N-channel microprocessor manufactured by National Semiconductor. Other suitable microprocessors are available. The microprocessor 60 receives power through an ON/OFF switch S5 from a portable power source 64, herein a conventional 9 volt d.c. battery. The microprocessor 60 is clocked by a clock circuit comprised of resistor R1 and capacitor C1. The values of resistor R1 and capacitor C1 are selected to provide a clock signal of approximately 60 KHz. The RESET terminal of the microprocessor 60 is tied to another RC timing network consisting of resistor R2 and capacitor C2, which serves to automatically provide a reset signal for a predefined duration (approximately 25 msec.) each time the system is energized. A momentary action reset switch S2 is connected between the RESET terminal of the microprocessor 60 and ground so that the display 25 can be reset to zero at any blade adjustment position. This permits the operator to accurately adjust the depth of cut relative to any desired reference position.

The particular microprocessor utilized in the preferred embodiment contains direct LED digit and segment drives permitting the connection of a conventional four-digit LED display 25 directly to the driver output ports ($L_0$–$L_7$ and $D_0$–$D_4$) of the microprocessor 60.

The $G_0$–$G_3$ input ports of the microprocessor 60 are connected to the 52-position encoder switch 36, a mercury orientation switch S4, and the mode select switch S3, respectively. The two-channel output from the 52-position switch 36 provides the microprocessor 60 with feedback information concerning the relative position of the blade. More particularly, by counting the number of position changes of the 52-position switch discerning the direction of change, and knowing the amount of blade travel corresponding to a single switch position change, the microprocessor 60 can determine the total blade movement relative to a preselected reference position. In the preferred embodiment, one revolution of adjustment shaft 28 corresponds to 0.50 inches of blade travel. Therefore, to provide an English units read-out the microprocessor 60 multiplies the switch count by a factor of 50/52, and for a Metric units read-out the microprocessor multiplies the switch count by $(50/52) \times 2.54$.

Thus, it will be appreciated that in order to adjust the blade to a desired cutting depth, the operator simply places the router 10 on a flat surface, adjusts the blade depth so that the blade contacts the surface, presses the RESET pushbutton S2 to reference the display 25, and then adjusts the blade adjustment mechanism 20 until the desired cutting depth appears on the display 25.

Since it is sometimes convenient, particularly with a router, to make blade adjustments with the router positioned upside-down, the preferred embodiment includes a mercury orientation switch S4 disposed within the housing 12 that is adapted to change states in accordance with the orientation of the router 10. Specifically, when the router 10 is rightside up, the mercury switch S4 is open, and when the router 10 is upside-down, the mercury switch S4 is closed. The microprocessor 60 is programmed to interrogate the position of the mercury switch S4 and orient the display 25 accordingly. Thus, when switch S4 is open, the microprocessor 60 will display the depth adjustment read-out rightside up, and when switch S4 is closed, the microprocessor 60 will display the depth adjustment read-out upside-down. In this manner, regardless of the orientation of the router 10, the display 25 is always properly oriented from the operator's perspective.

The mode select switch S3 connected to the G3 input port of the microprocessor 60 provides the operator with the option of selecting either English or Metric units. Specifically, the microprocessor 60 is programmed to interrogate the state of the mode select switch S3 and perform the appropriate conversion calculations discussed above to produce a read-out in inches when the switch S3 is open and in centimeters when the switch S3 is closed.

While the above description constitutes the preferred embodiment of the present invention, it will be appreciated that the invention is susceptible to modification, variation and change without departing from the proper scope or fair meaning of the accompanying claims.

What is claimed is:

1. A digital read-out system for a portable power tool having a cutting implement and adjustment means for varying the position of the cutting implement, comprising:
   (a) position encoder means connected to the adjustment means for producing a position signal related to the movement effected by the adjustment means,
   (b) orientation means connected to the tool for producing a signal related to the orientation of the tool with respect to a reference plane,
   (c) computer means responsive to the position signal and to the orientation signal for calculating the amount of adjustment relative to a reference position and for controlling the orientation of the read-out, and
   (d) digital display means operatively connected to the computer means for indicating the amount of adjustment in a display oriented with respect to the reference plane regardless of the orientation of the tool.

2. The combination claimed in claim 1, further comprising:
   (a) reset means for producing a reset signal, and wherein
   (b) the computer means being further responsive to the reset signal for establishing the reference position by setting the digital display means to zero.

3. The combination claimed in claim 2 wherein the position encoder means includes a multiple-position switch coupled to the adjustment means and which produces a two-channel gray code digital output that changes state for each predetermined incremental movement of the adjustment means.

4. The combination claimed in claim 2 wherein the position encoder means includes an optical linear position sensor for producing a two-channel digital output.

5. The combination claimed in claim 3, further comprising:
   (a) mode select means connected to the tool for selecting either English or metric units, and wherein
   (b) the computer means further includes means responsive to the mode select means for selectively setting the digital display means to read out the amount either in English or metric units.

6. A portable power tool viewable from an operator's perspective and having a base, a motor contained within a housing supported by the base, and a cutting implement drivingly connected to the motor, comprising:
   (a) adjustment means connected to the housing for controlling the depth of cut of the cutting implement relative to the base,
   (b) position encoder means connected to the adjustment means for producing a position signal related to the movement effect by the adjustment means,
   (c) orientation means connected to the housing for producing an orientation signal related to the orientation of the power tool with respect to the reference plane of the operator's perspective,
   (d) digital display means connected to the housing for indicating the amount of adjustment, and
   (e) microprocessor means connected to the housing and responsive to the position signal and the orientation signal for determining the amount of adjustment, for setting the digital display means to that amount, and for orienting the display read-out to the reference plane regardless of the orientation of the power tool.

7. The combination claimed in claim 6, wherein:
   (a) the position encoder means includes a two-channel position encoder producing a two-bit digital output signal which changes state for each incremental movement of the adjustment means in accordance with a predefined code,
   (b) the microprocessor means receives the two-bit digital output signal and is programmed to determine therefrom the amount of adjustment relative to a preset reference position by determining the direction of the adjustment means based on a change in state of the two-bit digital output signal and by counting the number of times the state of the two-bit output signal changes in a direction, and
   (c) the digital display means indicates the amount of adjustment relative to the reference position.

8. The combination claimed in claim 7, wherein:
   (a) the two-channel position encoder includes a multiple-position rotary switch adapted to produce a two-bit gray code, and further comprising:
   (b) mode select means connected to the housing for selecting either English or metric units, and wherein
   (c) the microprocessor means further includes means responsive to the mode select means for selectively setting the digital display means to read out the amount in English or metric units at any time during the operation of the tool.

9. The combination claimed in claim 8, further comprising:
   (a) reset means for producing a reset signal to establish the reference position, and wherein
   (b) the microprocessor means being responsive to the reset signal for setting the digital display means to zero by zeroing the count of the changes in the digital output signal.

10. The combination claimed in claim 9, wherein:
    (a) the tool is a router having a housing normally above the plane of the base, (b) the microprocessor means includes means for causing the display means to read-out the depth adjustment rightside-up with respect to the reference plane of the operator when the router housing is above the plane of the base, and for causing the display means to continue to read-out the depth adjustment rightside-up with respect to the reference plane of the operator when the housing is below the plane of the base.

11. A portable router viewable from an operator's reference plane, having a base, a housing mounted on the base and containing a motor, and a tool bit drivingly connected to the motor, comprising:
(a) adjustment means connected to the housing for controlling the depth of cut of the tool bit,
(b) position encoder means connected to the adjustment means for producing a position signal related to the movement effected by the adjustment means,
(c) orientation means connected to the housing for producing an orientation signal related to whether the router is rightside-up or upside-down with respect to the operator's reference plane,
(d) digital display means connected to the housing for indicating the amount of adjustment, and
(e) microprocessor means connected to the housing and responsive to the position signal and the orientation signal for determining the amount of adjustment, for setting the digital display means to that amount, and for orienting the display means to read right-side up from the reference plane of the operator regardless of the orientation of the router.

* * * * *